United States Patent
Heltsch (10) Patent No.: US 11,273,895 B2
(45) Date of Patent: Mar. 15, 2022

(54) PLANAR PRESSURE BULKHEAD FOR AN AIR- OR SPACECRAFT AND AIR- OR SPACECRAFT

(71) Applicant: Airbus Operations GmbH, Hamburg (DE)

(72) Inventor: Norbert Heltsch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 317 days.

(21) Appl. No.: 16/168,200

(22) Filed: Oct. 23, 2018

(65) Prior Publication Data

US 2019/0127040 A1 May 2, 2019

(30) Foreign Application Priority Data

Oct. 26, 2017 (DE) ..................... 10 2017 219 213.5

(51) Int. Cl.
*B64C 1/10* (2006.01)
*B64C 1/00* (2006.01)

(52) U.S. Cl.
CPC ........ *B64C 1/10* (2013.01); *B64C 2001/0072* (2013.01)

(58) Field of Classification Search
CPC ... B64C 1/10; B64C 2001/0072; B64C 1/061; Y02T 50/40; B64G 1/22
See application file for complete search history.

(56) References Cited

U.S. PATENT DOCUMENTS

| 6,443,392 | B2 * | 9/2002 | Weber ....................... B64C 1/10 244/117 R |
| 8,033,503 | B2 | 10/2011 | Basso |
| 8,444,089 | B2 * | 5/2013 | Mischereit ............... B64C 1/10 244/119 |
| 8,596,578 | B2 | 12/2013 | Noebel et al. |
| 10,053,205 | B2 * | 8/2018 | De Jong ................... B64C 1/10 |
| 10,086,923 | B2 * | 10/2018 | Seack ..................... B64C 1/064 |
| 2010/0243806 | A1 * | 9/2010 | Veravillares .............. B64C 1/10 244/119 |

(Continued)

FOREIGN PATENT DOCUMENTS

DE  10 2006 029 231 A1  1/2008
DE  10 2010 018 933 A1  11/2011

(Continued)

OTHER PUBLICATIONS

German Search Report for Application No. 10 2017 219 213.5 dated Feb. 12, 2018.

*Primary Examiner* — Medhat Badawi
*Assistant Examiner* — Vicente Rodriguez
(74) *Attorney, Agent, or Firm* — Jenkins, Wilson, Taylor & Hunt, P.A.

(57) ABSTRACT

A planar pressure bulkhead for an air- or spacecraft, including a first planar wall designed as a pressure seal for a fuselage structure, a second planar wall arranged opposite the first wall, and a reinforcing structure which is arranged between the first and the second wall and which includes at least one circumferential monolithic reinforcing element. Furthermore, the present disclosure provides an air- or spacecraft, including a fuselage structure and a planar pressure bulkhead that is coupled to the fuselage structure in a circumferentially continuous manner.

20 Claims, 9 Drawing Sheets

(56) References Cited

U.S. PATENT DOCUMENTS

| | | | |
|---|---|---|---|
| 2014/0054419 A1* | 2/2014 | Grase | B64C 1/10 |
| | | | 244/121 |
| 2017/0021908 A1* | 1/2017 | Jorn | B32B 5/18 |
| 2017/0327199 A1* | 11/2017 | Grase | B64C 1/10 |

FOREIGN PATENT DOCUMENTS

| | | |
|---|---|---|
| DE | 10 2012 016 553 A1 | 2/2014 |
| DE | 600 29 963 T3 | 8/2015 |
| DE | 102015 111 935 A1 | 1/2017 |

* cited by examiner

PLANAR PRESSURE BULKHEAD FOR AN AIR- OR SPACECRAFT AND AIR- OR SPACECRAFT

CROSS-REFERENCE TO RELATED APPLICATION

This application claims priority to German patent application DE 102017219213.5 filed Oct. 26, 2017, the entire disclosure of which is incorporated by reference herein.

TECHNICAL FIELD

The disclosure herein relates to a planar pressure bulkhead for an air- or spacecraft and an air- or spacecraft.

BACKGROUND

Existing pressure bulkhead concepts generally comprise a connection of a spherical or bubble-shaped membrane to the fuselage structure. For this purpose, construction principles involving tension elements, L- and Y-profiles for attachment to the main structure are often used. The membrane is designed such that the cabin is sealed in a pressure-tight manner, such that the excess pressure in the cabin is maintained at cruising altitude.

A spherical membrane of this kind is a relatively simple construction solution which, as intended, only produces little bending strain. The interface between the pressure bulkhead and the skin is typically accompanied by a rigid frame, which is used to equalize radial loads. The axial loads are then equalized by the tension elements, which ultimately divert the X loads into the skin and stringer.

Planar pressure bulkhead solutions have since been developed as well. For example, DE 10 2010 018 933 A1 describes a planar pressure bulkhead comprising a support structure, which comprises radial stiffeners. Moreover, DE 10 2006 029 231 A1 describes an approximately planar pressure bulkhead which is formed of a net-like component and radial reinforcements. Moreover, DE 10 2012 016 553 A1 describes a connection for a planar pressure bulkhead to a fuselage structure.

SUMMARY

Against this background, an aspect of the present disclosure is to provide an improved planar pressure bulkhead and an improved connection to a fuselage structure.

According to the disclosure herein, this is achieved by a planar pressure bulkhead for an air- or spacecraft and by an air- or spacecraft having features disclosed herein.

Accordingly, the following is provided:

A planar pressure bulkhead for an air- or spacecraft, comprising: a first planar wall, which is designed as a pressure seal for a fuselage structure; a second planar wall, which is arranged opposite the first wall; and a reinforcing structure, which is arranged between the first and the second wall and which comprises at least one circumferential monolithic reinforcing element.

An air- or spacecraft, comprising: a fuselage structure; and a planar pressure bulkhead according to the disclosure herein that is circumferentially coupled to the fuselage structure.

A concept underlying the present disclosure is that of providing a sandwich-like design for a planar pressure bulkhead by the first and second wall and the monolithic circumferential reinforcing elements, which sandwich-like design allows a continuous circumferential connection to the fuselage structure and does not require any foam or honeycomb cores. In this way, a monolithic sandwich concept for a planar pressure bulkhead is implemented in such a way that a continuous connection to the fuselage structure is made possible and thus load concentrations are prevented. As a result, the connection can be realised in a far easier and more lightweight manner.

The monolithic design advantageously has a high damage tolerance and allows for easy inspection, in particular in comparison to conventional sandwich designs. Furthermore, the sandwich-like design according to the disclosure herein of a planar pressure bulkhead requires no reinforcing supports, rigid frames, ribs or beams. In this way, a significant amount of weight is saved in comparison to other planar pressure bulkhead concepts as well, such that a similar weight to that of a spherical pressure bulkhead that restricts the cabin space significantly more can in particular be achieved. By the planar pressure bulkhead according to the disclosure herein, the cabin space is thus advantageously increased without compromising on weight.

By the particularly rigid monolithic sandwich concept according to the disclosure herein, deformations of the pressure bulkhead and thus also bending stresses in the region of the connection to the fuselage structure are prevented. In this way, it is possible to dispense with complex connection devices, such as tension elements, L- or Y-profiles or the like, which have until now often been necessary due to bending stresses. Instead, a very simple connection is sufficient, for example in the form of an L-bracket, which substantially only transfers the planar loads resulting from the cabin pressure to the fuselage shell. In this way, the complexity of the assembly process, in particular when the main components are assembled or during the final stages of assembly, is greatly reduced.

Advantageously, it is still very easy to provide through-openings for maintenance and for system lines. Sealed passages for the system lines may very easily be provided on the first wall that closes the cabin, for example by simple screw connections. In particular, it is not necessary for the connection pieces to be spherical in shape for this purpose.

Openings may be provided as required on the second wall, for example for system implementation, for ventilating the structure or for assembly and/or maintenance purposes.

The first and the second wall and the circumferential reinforcing elements may be interconnected and also connected to the fuselage structure in different ways. For this purpose, connections using attachment or integral bonding are conceivable. Whereas in a conventional design rivet connections can primarily be used, it is also possible to use a thermoplastic design, for example using thermoplastic fibre composite materials and to provide thermoplastic welded connections.

The pressure bulkhead according to the disclosure herein can, in particular when assembling a predominantly thermoplastic fuselage structure, thus make a significant contribution to time and cost savings in consideration of special requirements of pre-installed systems and cabin fittings.

Furthermore, within the scope of the disclosure herein, the pressure bulkhead may be composed of a wide variety of construction materials. In addition to a weldable thermoplastic design, a metal design, for example, which would also be weldable, is also conceivable. If attachment such as conventional rivet connections are primarily provided, designs not using weldable materials or mixed designs are also possible.

According to a development, the at least one reinforcing element comprises a plurality of oblique fins which extend from the first wall to the second wall. The oblique fins thus form diagonal reinforcing elements between the walls. In this way, a shear bond is provided which is particularly strong or which fundamentally contributes to the reinforcement in one embodiment. The oblique fins or diagonal reinforcing elements therefore provide the key monolithic replacement for a continuous core material, such as a foam or honeycomb structure, for example.

According to an advantageous development, the oblique fins or diagonal reinforcing elements are designed to extend circumferentially in the manner of a ring. The individual oblique fins that extend circumferentially in the manner of a ring thus form a lateral surface in the shape of a truncated cone that is attached by a bottom surface and a top surface to one of the first and second walls, respectively. In this way, the load is uniformly distributed over the walls, which makes it possible for the load to be continuously transferred and continuously introduced into the fuselage structure.

According to a development, the oblique fins that extend circumferentially in the manner of a ring or the diagonal reinforcing elements that extend circumferentially in the manner of a ring have different diameters and are arranged concentrically. The oblique fins or diagonal reinforcing elements are preferably arranged in a substantially concentric manner, it being possible for there to be deviations from an ideal concentricity. At the very least, deviations in terms of manufacturing tolerances are possible. However, desired deviations, for example for adapting to different fuselage cross-sectional shapes, are also possible, for example.

According to an embodiment, the oblique fins or diagonal reinforcing elements each comprise a radially outer flange on a first axial end and a radially inner flange on a second axial end for attachment to the first and second wall, respectively. In this way, a kind of circumferential hat shape having a central opening is formed. The flanges advantageously make possible a simple connection to the walls using conventional attachment techniques, such as rivets or, in particular in the case of thermoplastic designs, welding.

In other embodiments, for example an intricate preform for a co-infusion method, the flanges may also be designed to be at least partially integral with the first and/or second wall. A one-piece or integral design is therefore possible.

According to an advantageous development, the first axial end is attached to the first wall by the radially outer flange and the second axial end is attached to the second wall by the radially inner flange. Thus the oblique fins of the pressurized cabin-side first wall extend obliquely radially and axially inwards towards the second wall. The oblique fins are thus formed substantially along natural load paths through the pressure bulkhead that result from the pressure difference between the cabin and the surrounding at cruising or operational altitude.

According to a development, the oblique fins or diagonal reinforcing elements and the radially inner and outer flanges are also designed to be circumferential. Overall, this produces a circumferentially continuous, in particular concentric, structure.

According to a development, a radially outer flange and a radially inner flange of adjacent fins are in each case interconnected via an axial coupling element. The axial coupling element is provided as a reinforcing element that is arranged perpendicularly to the walls and thus prevents internal deformation of the pressure bulkhead and, in particular, collapse thereof. The oblique fins or diagonal reinforcing elements substantially react to distributed loads from the internal pressure of a cabin by pushing against the walls and/or cover layers. The axial coupling elements or perpendicular reinforcing elements absorb the reaction loads from the diagonal elements and from "Brazier" effects and thereby ensure that the distance between the cover layers and thus the flexural strength of the bond is maintained.

The axial coupling element or the reinforcing element arranged perpendicularly to the walls is oriented at least substantially axially, but with deviations, for example a slight inclination with respect to the axial direction, in particular in the region of less than 20°, preferably in the region of less than 10°, being possible. An inclination of this kind may be advantageous, depending on the design of the reinforcing structure, to facilitate connection or production.

In an embodiment, the axial coupling elements or the reinforcing elements arranged perpendicularly to the walls are designed as supports that extend circumferentially in the manner of a ring. The supports are in each case a type of annular rib that spaces a radially outer flange apart from a radially inner flange of adjacent fins in a continuously circumferential manner and couples the flanges together.

According to a particularly advantageous development, the axial coupling elements or the reinforcing elements arranged perpendicularly to the walls comprise a first flange on a first end and a second flange on a second end. The flanges for example have a Z cross section profile or a double-T cross section profile (also referred to as an I-profile). Each first flange of the ridges is connected to a radially inner flange of an oblique fin or diagonal reinforcing element and each second flange of the ridges is connected to a radially outer flange of an adjoining oblique fin or diagonal reinforcing element. In this way, an effective and continuous connection that is simple to produce is provided between the individual oblique fins or diagonal reinforcing elements, and thus the structure is axially reinforced.

According to another embodiment, the circumferentially monolithic reinforcing element has a three-dimensional structure. The plurality of oblique fins is in this case integrally formed in the three-dimensional structure of the reinforcing element. Alternatively or additionally, the reinforcing elements may also be integrally formed with one another and may also be integrally formed with the oblique fins in the three-dimensional structure of the reinforcing element. Advantageously, in this way, the pressure bulkhead can be assembled in few steps, in particular from only three components, i.e. the two walls and the reinforcing element.

According to an advantageous embodiment, the first and the second wall are interconnected on an outer peripheral edge and are designed for circumferential connection to a fuselage structure. In this way, a connection of the pressure bulkhead to the fuselage structure via the first and second wall is achieved, such that no additional circumferential frame is required. This advantageously decreases the weight.

According to a development, the first and the second wall comprise a join on the outer peripheral edge that is integrally formed with the outer peripheral edge for direct connection to the fuselage structure. The join is in particular a common join. Preferably, the join is designed for connection to a skin of the fuselage structure. Both cover layers that form the first and second walls may for example be joined at the outer edge at an acute angle and at the same time form a flange for connection to the skin or shell in this region. In this way, particularly advantageously, no additional connection components are required. Therefore, assembly is greatly simplified and weight is saved.

In other embodiments, for the purpose of simplifying the production of individual parts, the two cover layers can initially be joined on the outer edge in order to then be connected to the skin or shells by a separate connection bracket or L-profile. A separate connection bracket may be provided for tolerance compensation, depending on the assembly concept.

According to an advantageous embodiment of an air- or spacecraft, the first wall and the second wall are axially angled so as to form the join on the peripheral edge and are directly coupled to the fuselage structure in a circumferential, and in particular continuous, manner. In this way, an integral connection is produced which can be produced so as to entail significantly reduced assembly outlay.

According to another embodiment, the first and the second wall comprise a common connection point for connecting a first limb of a circumferential folded sheet, which is circumferentially attached by the second limb thereof to the fuselage structure. The folded sheet may in particular be designed as an angular profile, which is preferably designed to be continuous. Furthermore, the second limb is preferably attached circumferentially to the skin of the fuselage structure. In this way, a particularly simple attachment, which can be positioned in a particularly flexible manner during assembly, is provided. In this way, the pressure bulkhead according to the disclosure herein can be used in a particularly varied manner in different configurations of a fuselage structure without increasing the assembly outlay.

The above-mentioned embodiments and developments can be combined in any manner, if appropriate. Further possible embodiments, developments and implementations of the disclosure herein include combinations of features of the disclosure herein described previously or below with respect to the embodiments, even if not explicitly specified. In particular, a person skilled in the art will also add individual aspects as improvements or supplements to the particular basic form of the present disclosure.

BRIEF DESCRIPTION OF THE DRAWINGS

The present disclosure will be described in greater detail below with reference to the embodiments shown in the schematic and example drawings, in which.

DETAILED DESCRIPTION

The accompanying drawings are intended to facilitate further understanding of the embodiments of the disclosure herein. The drawings illustrate embodiments and, together with the description, serve to explain principles and concepts of the disclosure herein. Other embodiments and many of the advantages mentioned can be found with reference to the drawings. The elements of the drawings are not necessarily shown true to scale relative to one another.

In the figures of the drawings, identical, functionally identical and identically operating elements, features and components are in each case provided with the same reference numerals, unless indicated otherwise.

Figure 1:
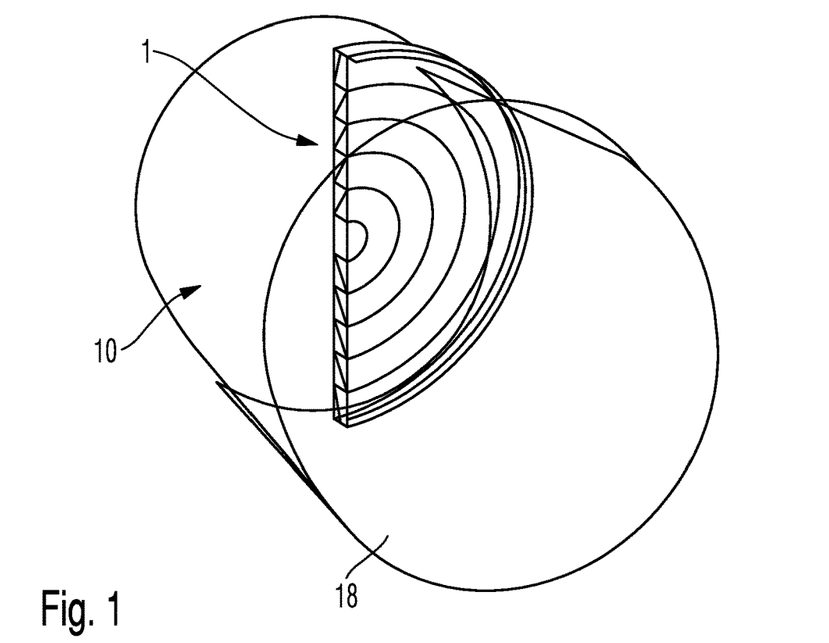
FIG. 1 is a sectional representation of a planar pressure bulkhead in a schematically represented fuselage structure.

FIG. 1 is a sectional representation of a planar pressure bulkhead 1 in a schematically represented fuselage structure 10.

The pressure bulkhead 1 is used as a pressure seal for the fuselage structure 10 that separates the pressurized cabin from a unpressurized tail of an air- or spacecraft. On account of the planar design of the pressure bulkhead, a greater amount of usable cabin space is available in comparison to a spherical pressure bulkhead.

Figure 2:
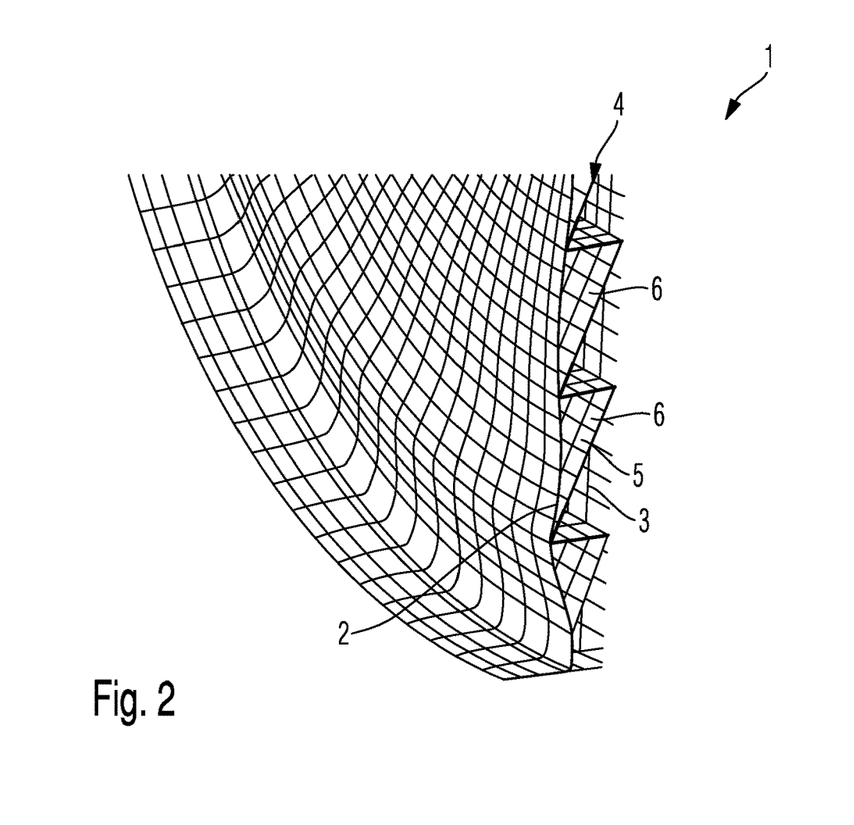
FIG. 2 is a perspective sectional representation of a portion of the pressure bulkhead according to FIG. 1.

FIG. 2 is a perspective sectional representation of a portion of the pressure bulkhead according to FIG. 1.

The planar pressure bulkhead 1 comprises a first planar wall 2, which is designed to be pressure-tight and can thus act as a pressure seal for a fuselage structure 10. A second planar wall 3 that does not necessarily have to be pressure-tight is arranged opposite the first wall 2. Rather, the second wall may comprise openings for maintenance and/or ventilation purposes and for simplified implementation of systems.

A reinforcing structure 4 is arranged between the first wall 2 and the second wall 3. The reinforcing structure comprises at least one circumferential monolithic reinforcing element 5.

In the embodiment shown here, the at least one reinforcing element 5 comprises a plurality of circumferential oblique fins 6 which extend from the first wall 2 to the second wall 3. The oblique fins 6 have different diameters and are arranged concentrically.

The reinforcing structure 4 provided between the first wall 2 and the second wall 3 is formed exclusively of monolithic elements. A monolithic sandwich structure is thus formed together with the walls 2, 3. Typical sandwich core materials, such as foams or honeycomb structures, are therefore not provided. The planar pressure bulkhead is therefore in particular free from foam and honeycomb structures. It is preferably free from closed cavities.

Figure 3:
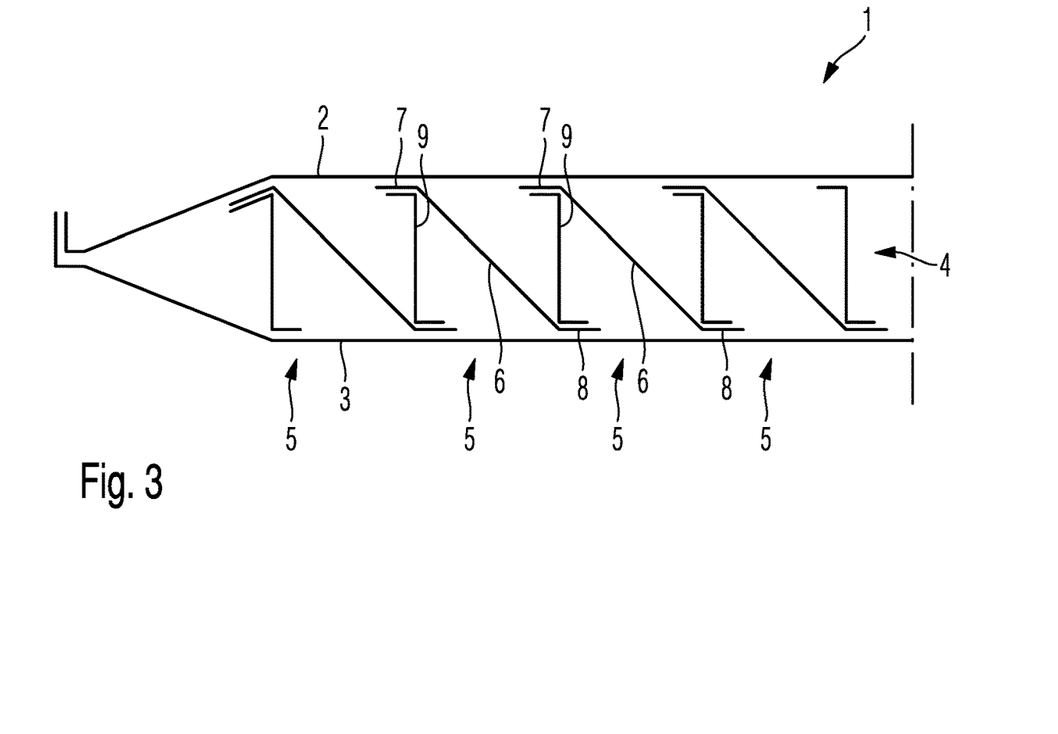
FIG. 3 is a schematic cross-sectional representation of the structure of a planar pressure bulkhead according to an embodiment.

FIG. 3 is a schematic cross-sectional representation of the structure of a planar pressure bulkhead 1 according to an embodiment.

In this embodiment, the reinforcing structure 4 is formed with a plurality of reinforcing elements 5 which each comprise an oblique fin 6. The oblique fins 6 each comprise a radially outer flange 7 on a first axial end and a radially inner flange 8 on a second axial end for attachment to the first and second wall 2, 3. The first axial end is attached by the radially outer flange 7 to the first wall 2. The second axial end is attached by the radially inner flange 8 to the second wall 3. An axial coupling element 9 is provided between the radially outer flange 7 and the radially inner flange 8 of an adjacent fin 6 adjoining the outer flange, which coupling element connects the adjoining flanges 7, 8 of adjoining fins 6 and thus sets the spacing therebetween and also the spacing between the first and second walls 2, 3. In this way, the individual monolithic reinforcing elements 5 are interconnected to form a contiguous reinforcing structure 4.

The oblique fins 6 and the radially inner and outer flanges 7, 8 are designed to be circumferential. Furthermore, the axial coupling elements 9 functioning as reinforcing elements that are perpendicular to the walls are also designed to be circumferential as ring-like supports 11.

The supports 11 comprise a first flange on a first axial end and a second flange on a second axial end for attachment to the flanges 7, 8. The first flange of the supports 11 is in each case connected to the radially inner flange 8 of the oblique fin 6. The second axial flange of the supports 11 is in each case connected to the radially outer flange of the adjacent oblique fin 6.

The first and second wall 2, 3 are interconnected on an outer peripheral edge 12 of the pressure bulkhead 1. By way of example, in the embodiment shown, the two walls 2, 3 are designed to converge at the edge 12. Of course, the connection may also be designed, for example, in that one of the walls 2, 3 is straight and merely the other of the walls 2, 3 extends towards the first one.

At the edge 12, the walls 2, 3 are together designed for continuous circumferential connection to a fuselage structure 10.

Figure 4:
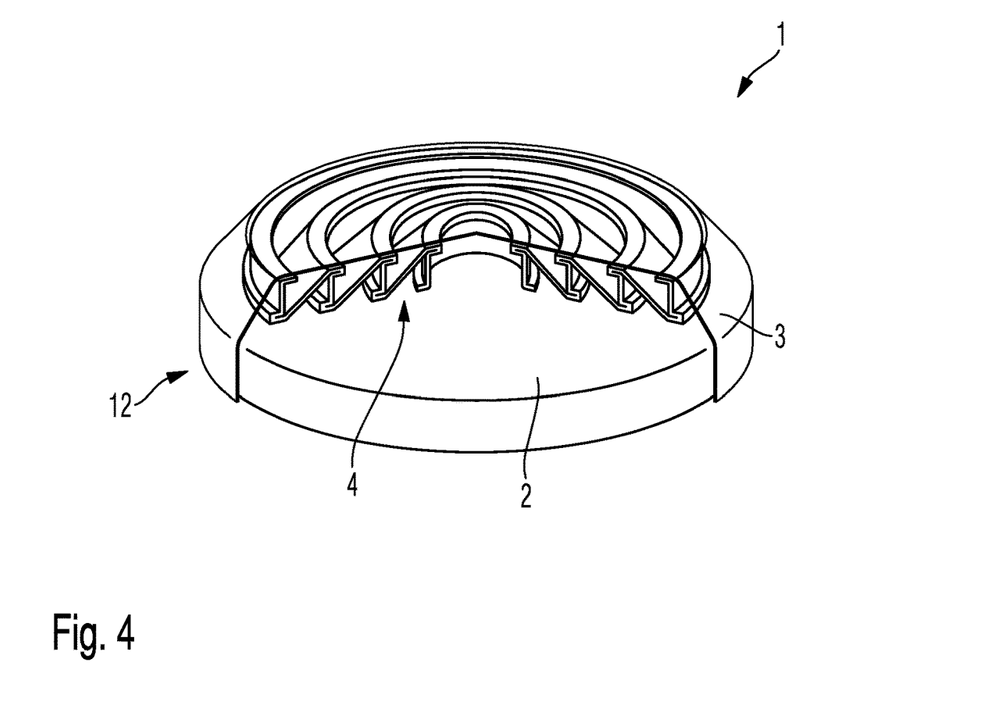
FIG. 4 is a perspective illustration of a planar pressure bulkhead having a structure according to FIG. 3.

FIG. 4 is a perspective illustration of a planar pressure bulkhead 1 having a structure according to FIG. 3.

The first wall 2 is in this case shown to be continuous, whereas the second wall 3 and the reinforcing structure 4 are shown in part in section.

In contrast to FIG. 3, the outer edge 12, together with the walls 2, 3, is in this case inclined towards the cabin side in such a way that it can be placed on a skin 18 of a fuselage structure 10, as shown schematically in FIG. 1.

Figure 5:
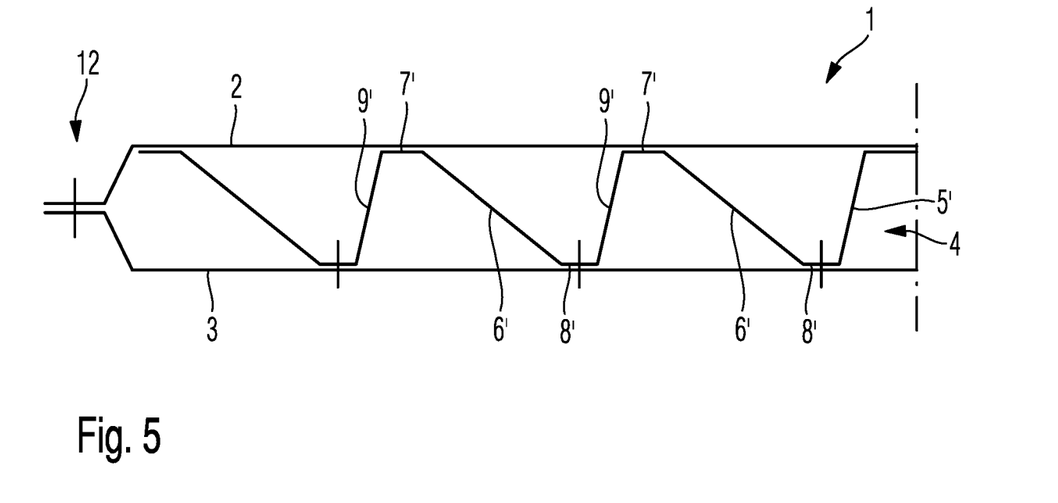
FIG. 5 is a schematic cross-sectional representation of the structure of a planar pressure bulkhead according to another embodiment.

FIG. 5 is a schematic cross-sectional representation of the structure of a planar pressure bulkhead 1 according to another embodiment.

In this embodiment, the reinforcing structure 4 comprises a single circumferentially monolithic reinforcing element 5'. The reinforcing element has a three-dimensional structure in which a plurality of oblique fins 6' and a plurality of axial reinforcing elements 9' are integrally formed with one another. Likewise, the flanges T, 8' are integrally formed with the three-dimensional structure.

In this way, a three-dimensional structure of concentric circular waves is formed, which structure comprises alternately radially and axially oblique fins 6' and coupling elements 9' that extend merely at a slight slant to an axial direction or that extend substantially axially.

For example, both the walls 2, 3 and the reinforcing element 5' may be thermoplastic fibre composite components which are initially produced separately and are then interconnected in a suitable manner. This is explained in greater detail with reference to FIG. 13A through 13D.

In this case, too, the first and the second wall 2, 3 are interconnected on the outer peripheral edge 12; for this purpose, merely by way of example, the two walls 2, 3 are designed to converge at the edge 12.

Figure 6:
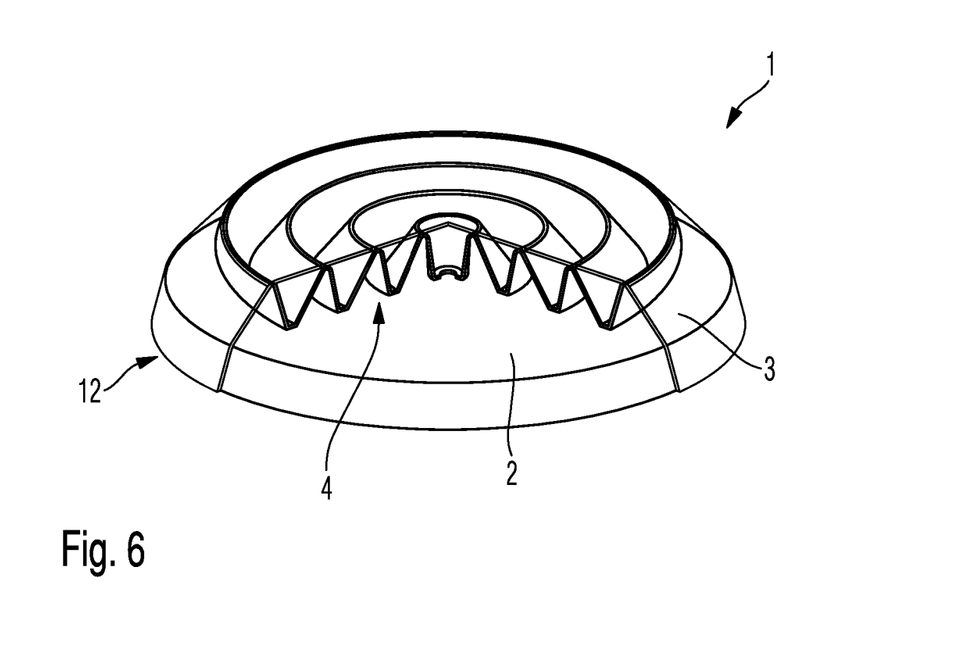
FIG. 6 is a perspective illustration of a planar pressure bulkhead having a structure according to FIG. 5.

FIG. 6 is a perspective illustration of a planar pressure bulkhead having a structure according to FIG. 5.

As explained with reference to FIG. 4, in this case, too, the first wall 2 is shown to be continuous, whereas the second wall 3 and the reinforcing structure 4 are shown in part in section. In contrast to FIG. 5, the outer edge 12 is in this case also inclined towards the cabin side together with the two walls 2, 3, such that only the second wall extends towards the first wall and the first wall 2 is angled in the same direction as the second wall 3.

Figure 7:
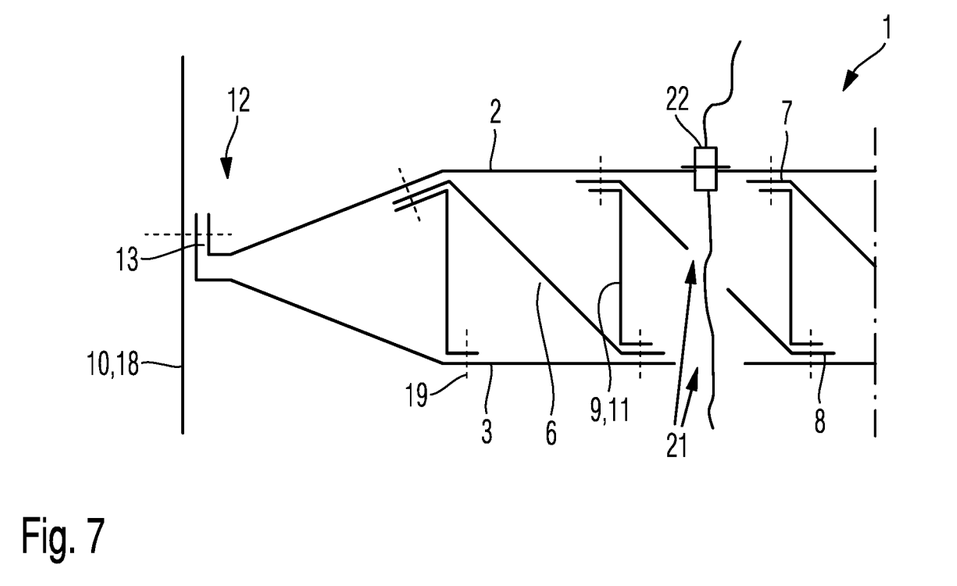
FIG. 7 is a schematic representation of an edge region of a planar pressure bulkhead that is connected to a fuselage structure.

FIG. 7 is a schematic representation of an edge region 12 of a planar pressure bulkhead 1 that is connected to a fuselage structure 10.

This embodiment is also a structure according to FIG. 3, attachment 19 being provided here for connecting the oblique fins 6 to the axial coupling elements 9. The attachment form a positive and/or non-positive connection between the walls 2, 3, the oblique fins 6 and the axial coupling elements 9. The attachment 19 may for example be rivet connections.

The walls 2, 3 are angled together at the outer edge 12, as in FIG. 4, and thus form an integral join 13, by which the pressure bulkhead 1 can be directly continuously, circumferentially coupled to a fuselage structure 10. In particular, the pressure bulkhead may be attached to a skin 18 (represented merely symbolically here) of a fuselage structure 10. A suitable attachment 19, in particular a rivet connection, may for example also be provided for this purpose.

Through-holes 21 for feeding through system lines are provided on the second wall 3 and on the oblique fins 6. The system lines are fed through the first wall 2 in an air-tight manner, for which purpose a seal 22 that is easy to install is provided. This may for example be in the form of an air-tight screw connection, cable bushing, collar or the like. The planar surface in the region of the bushing simplifies the design, production and installation of through-holes of this kind.

The pressure bulkhead 1 can therefore be assembled in a simple manner during assembly of the main components, and can also be easily inserted into the fuselage structure 10 of an air- or spacecraft 20 during the final stages of assembly.

Figure 8:
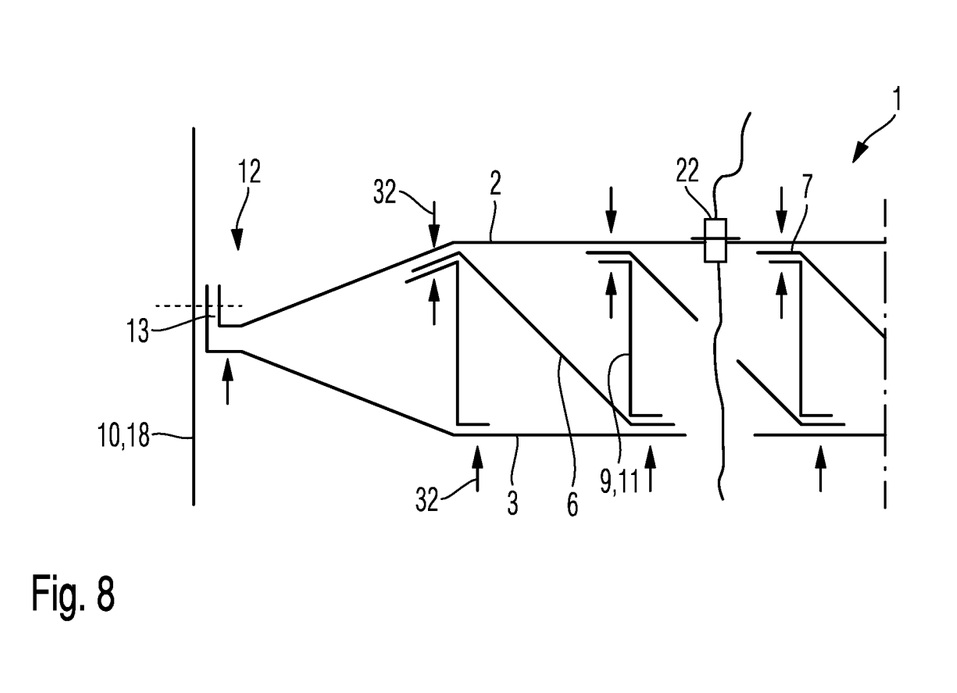
FIG. 8 is a schematic representation of an edge region of a planar pressure bulkhead according to another embodiment that is connected to a fuselage structure.

FIG. 8 is a schematic representation of an edge region 12 of a planar pressure bulkhead 1 according to another embodiment that is connected to a fuselage structure 10.

This embodiment also corresponds to the basic structure according to FIG. 3, however, in contrast to the embodiment according to FIG. 7, the attachment 19 are in this case replaced with welded connections 32 between the walls 2, 3, oblique fins 6 and axial coupling elements 9.

The components of the pressure bulkhead 1 are in this case made of weldable materials. For example, the materials may be a thermoplastic fibre composite structure. However, a weldable metal structure, for example made of aluminium, would also be conceivable.

Figure 9:
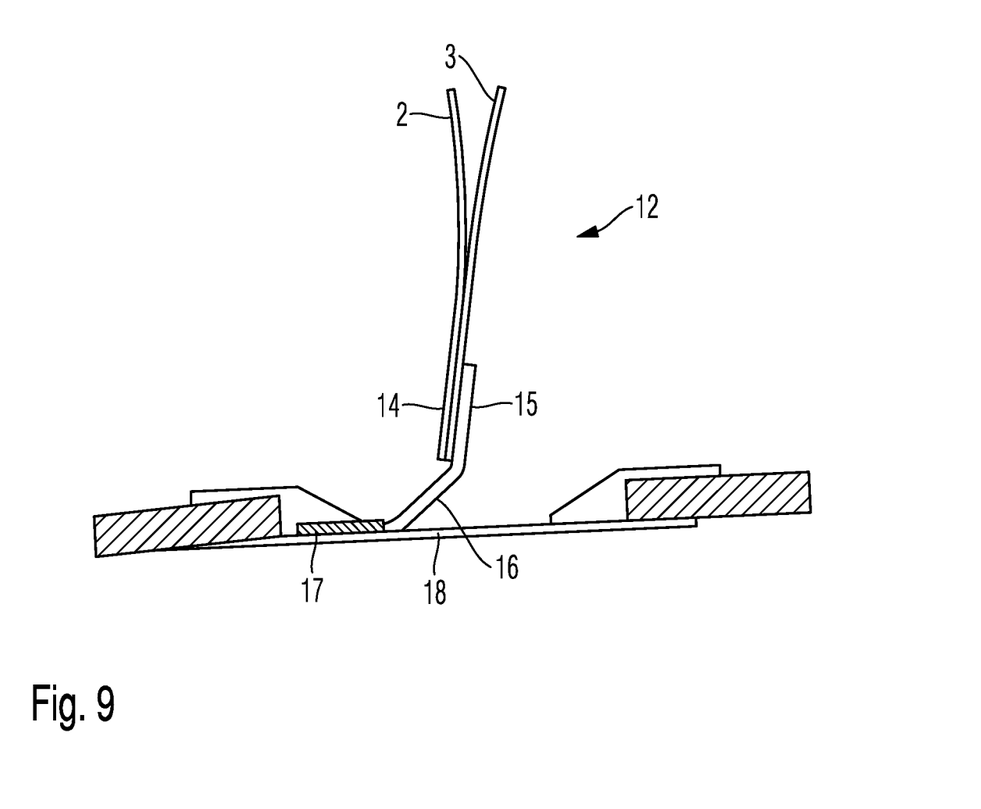
FIG. 9 is a schematic representation of an edge region according to yet another embodiment.

FIG. 9 is a schematic representation of an edge region 12 according to yet another embodiment.

In this case, the first and second walls 2, 3 are also joined and connected in the edge region 12, however they are not designed to be angled. Instead, the first and the second wall 2, 3 form a common radial connection point 14 for connecting a first substantially radially extending limb 15 of a circumferential folded sheet 16, which is designed in particular in the form of a continuous angular profile. The connection method has the advantage that, in the case of slight geometric deviations or minor alterations to the position of the pressure bulkhead 1 in the fuselage structure 10, only the folded sheet or angular profile has to be adapted to the alterations. This therefore provides for tolerance compensation, since gaps can be closed in a simple manner by sliding the bracket. This is advantageous, depending on the assembly processes and manufacturing tolerances, in particular if it is not possible or permissible to close any remaining gaps during the joining process. In this way, the field of application of the pressure bulkhead 1 is widened.

In accordance with a desired installation situation, the folded sheet 16 or angular profile is attached circumferentially to the skin 18 of the fuselage structure 10 by the second substantially axially extending limb 17 thereof. The orientation of the second limb 17 may in this case deviate from an ideal axial orientation, for example so as to be adapted to the course of the tail of a fuselage of an air- or spacecraft. This is represented in FIG. 9 by a slight inclination. The fuselage tail may for example be tapered in the manner of a cone in this region. This results in opening angles of the L-bracket of >90° over approximately the entire circumference of the pressure bulkhead.

Figure 10:
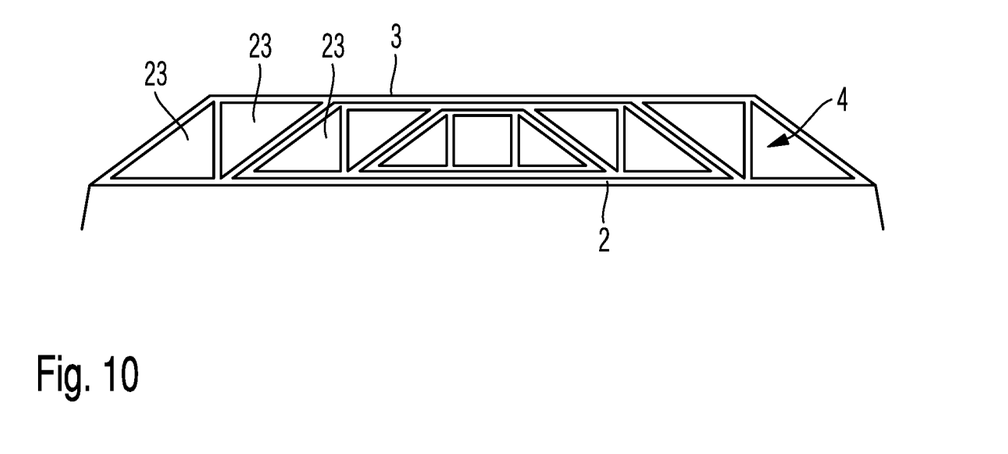
FIG. 10 is a schematic representation of a preform concept for producing a planar pressure bulkhead.

FIG. 10 is a schematic representation of a preform concept for producing a planar pressure bulkhead.

The concept is in this case a concept for producing an integral design of the planar pressure bulkhead 1.

The preform concept is a wound core comprising tubes 23 laid therein that correspond to the desired geometry of the hollow spaces and that can be gauged and removed after shaping. In this way, it is conceivable for the two walls 2, 3 and the reinforcing structure 4 to be integrally formed with one another and to be rigidly interconnected in a curing or consolidation step.

Figure 11:
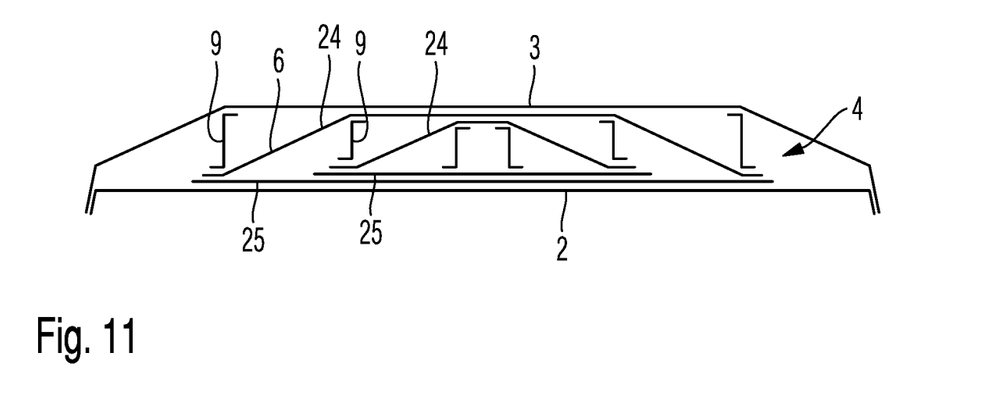
FIG. 11 is a schematic representation of another preform concept for producing a planar pressure bulkhead.

FIG. 11 is a schematic representation of another preform concept for producing a planar pressure bulkhead 1.

This preform concept is a simplified preform concept involving a large number of individual elements brought together. The oblique fins 6 are in this case each formed of circumferential hat elements 24. Z-profile ring elements are provided therebetween as axial coupling elements 9. Each hat element 24 is coupled to a base layer 25, which encloses the coupling elements 9 arranged inside the hat element.

The individual elements brought together may then be cured or consolidated together.

Figure 12A:
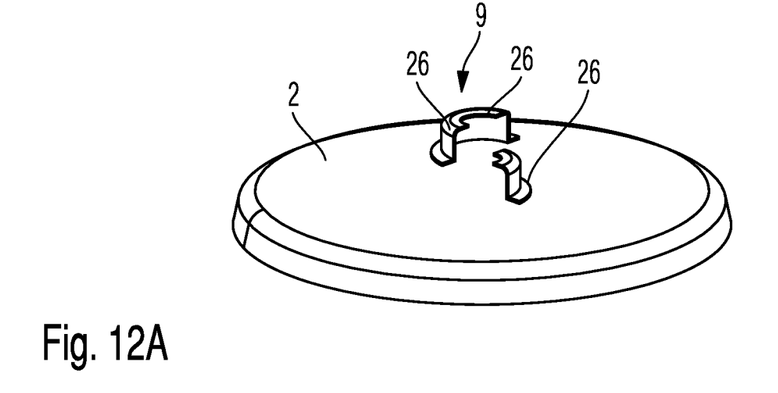
FIG. 12A is an illustration of the production and connection of a segmented axial coupling element.

FIG. 12A is an illustration of the production and connection of a segmented axial coupling element 9.

This is therefore an additional production concept for the planar pressure bulkhead 1, the pressure bulkhead being constructed in stages from segments which are individually attached to one another.

The coupling element 9 may, by way of example, be composed of four segments 26. The segments 26 each comprise an upper and a lower flange and thus together form a circumferential Z-profile ring, the central fin of which extends axially. The individual segments 26 are constructed on and attached to the first wall 2. The attachment is carried out by welding, for example.

Figure 12B:
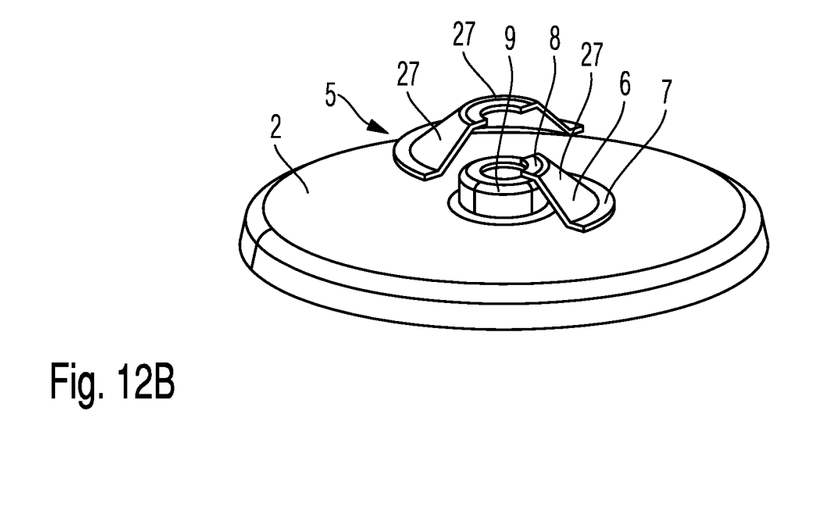
FIG. 12B is an illustration of the production and connection of a segmented circumferential oblique fin to the axial coupling element according to FIG. 12A.

FIG. 12B is an illustration of the production and connection of a segmented circumferential oblique fin to the axial coupling element according to FIG. 12A.

In the same way as the axial coupling element 9, the oblique fin 6 is also formed from segments 27 in a second step. The radially outer flange 7 is in this case placed on and attached to the first wall 2, whereas the radially inner flange 8 is placed on and attached to the free flange of the axial coupling element 9. In this case, too, the attachment is carried out by welding, for example.

The axial coupling element 9 and the oblique fin 6 thus together form a first radially innermost reinforcing element 5.

Figure 12C:
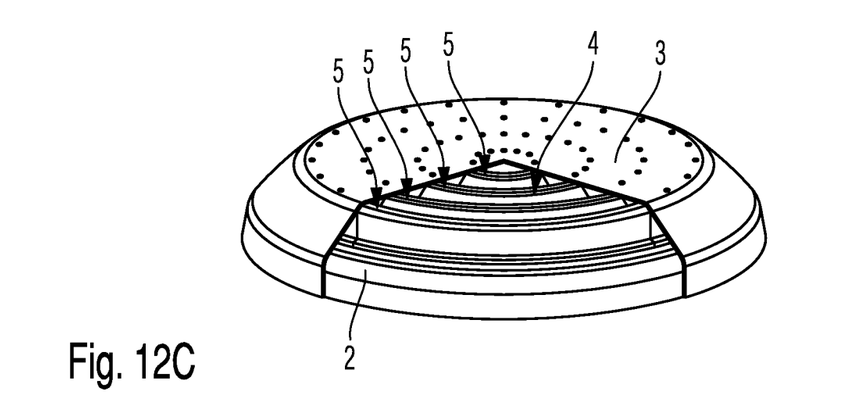
FIG. 12C is an illustration of the finalization of a planar pressure bulkhead produced having axial coupling elements and circumferential oblique fins according to FIGS. 12A and 12B.

FIG. 12C is an illustration of the finalisation of a planar pressure bulkhead 1 produced having axial coupling elements 5 and circumferential oblique fins 6 according to FIGS. 12A and 12B.

A total of four reinforcing elements 5 of this kind are arranged on the first wall 2 in a concentric manner and thus together form a reinforcing structure 4. Finally, the second wall 3 is placed over the reinforcing structure 4 and attached along the radially inner second flanges 8 of the oblique fins 6. In order to attach the second wall 3, a riveted connection is used, for example, in particular blind bolts.

Apart from a segmented design of this kind, integrated designs of the reinforcing structure are also possible, as explained with reference to the following FIG. 13A through 13D.

Figure 13A:
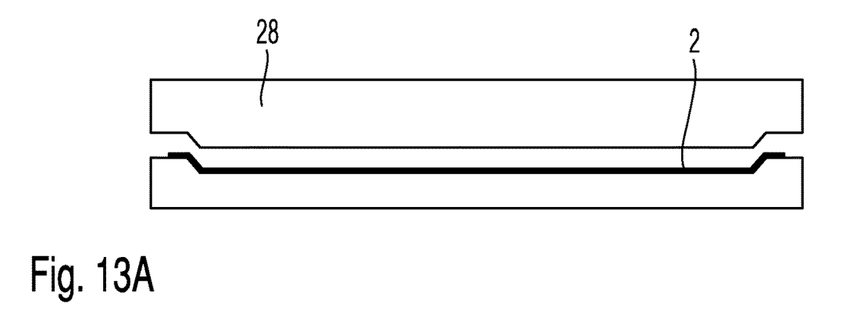
FIG. 13A is an illustration of the production of a first wall.

FIG. 13A is an illustration of the production of a first wall 2. The first wall is molded in a first mold 28.

Figure 13B:
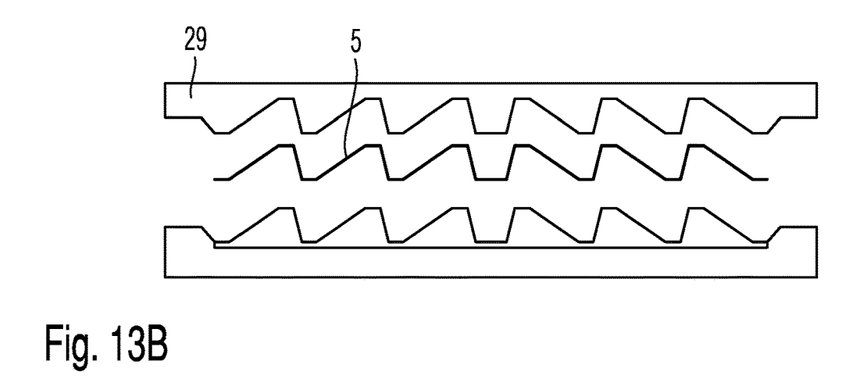
FIG. 13B is an illustration of the production of a reinforcing element having a three-dimensional structure.

FIG. 13B is an illustration of the production of a reinforcing element 5 having a three-dimensional structure.

The reinforcing element 5 is molded in a second mold 29 and produced integrally. All oblique fins 6 and axial coupling elements 9 are thus formed in the same molding step.

Figure 13C:
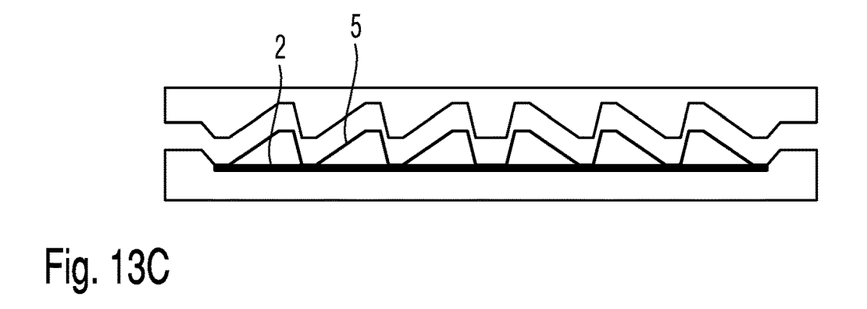
FIG. 13C is an illustration of a joining step for connecting the reinforcing element according to FIG. 13B to the first wall according to FIG. 13A.

FIG. 13C is an illustration of a joining step for connecting the reinforcing element 5 according to FIG. 13B to the first wall 2 according to FIG. 13A.

The first wall 2 and the reinforcing element 5 are introduced into a suitable joining tool for this purpose, which attaches, for example welds, the contact points of the reinforcing element 5 and first wall 2 to one another.

Figure 13D:
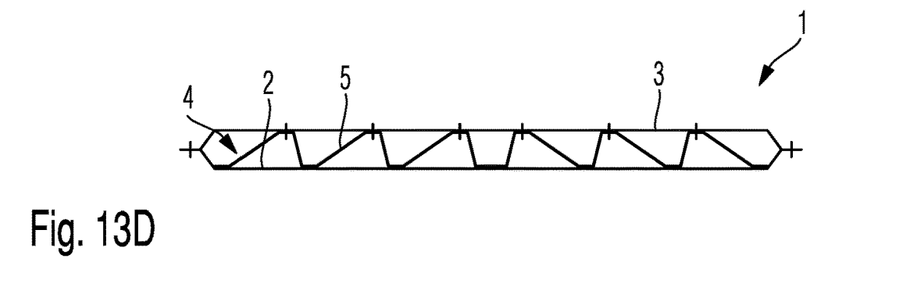
FIG. 13D shows a finished planar pressure bulkhead.

FIG. 13D shows a finished planar pressure bulkhead 1.

The pressure bulkhead 1 is completed by placing the second wall 3 on the opposite side of the reinforcing element 5 and attaching the corresponding contact points. In this case, too, rivet connections, in particular blind bolts, are preferably provided for attaching the second wall 3.

Figure 14:
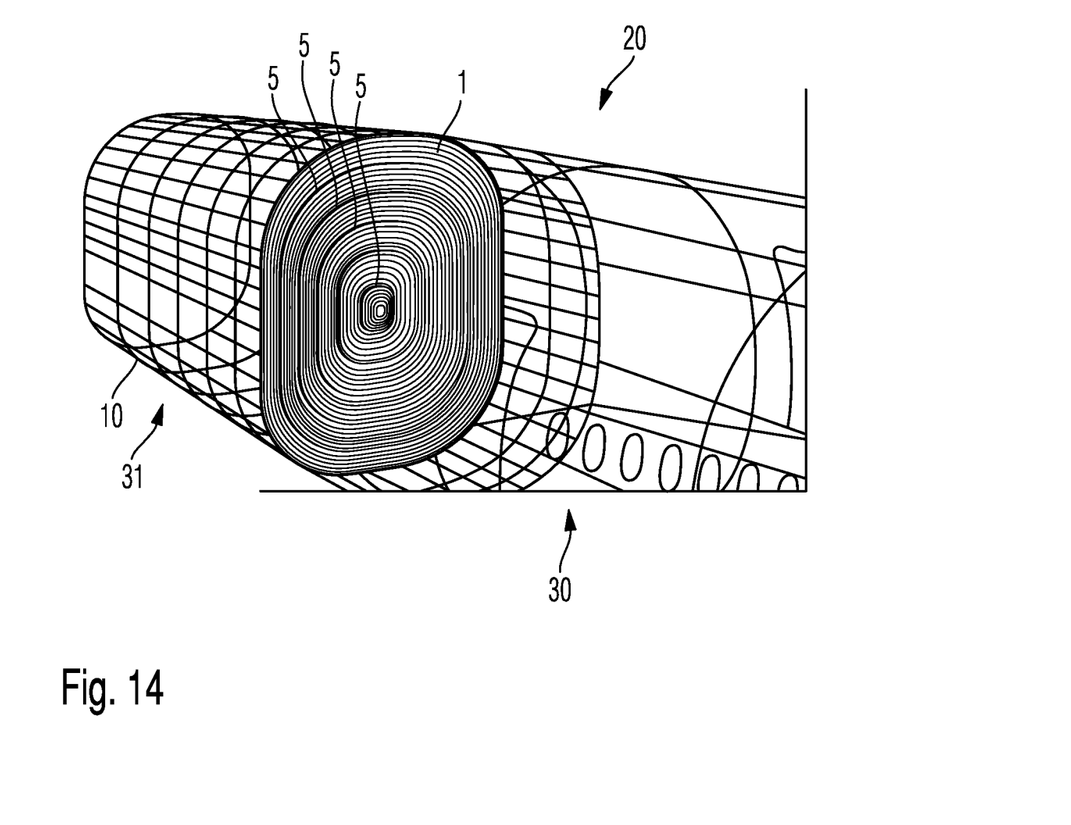
FIG. 14 is a wire-frame model of a portion of an air- or spacecraft.

FIG. 14 is a wire-frame model of a portion of an air- or spacecraft 20.

The air- or spacecraft 20 comprises a fuselage structure 10 that tapers axially towards the tail 31. The pressure bulkhead 1 divides a pressurized cabin 30 of the air- or spacecraft 20 from an unpressurized tail 31.

The pressure bulkhead 1 shown here differs from the previously shown embodiments on account of a radial course that is different around the circumference. In this case, the radially outer reinforcing elements 5 are adapted to a fuselage structure 10 having the shape of a rounded quadrilateral so as to also be in the shape of a rounded quadrilateral. Although the arrangement of the reinforcing elements is, as before, substantially concentric, the shape of the reinforcing elements 5 changes in a continuous manner from an approximately circular shape of the radially inner reinforcing elements to the rounded quadrilateral shape of the radially outer reinforcing elements 5.

The first and second walls 2, 3 of the pressure bulkhead 1, which are not shown here for the sake of greater clarity, also extend along the outer edge 12 in the manner of a rounded quadrilateral so as to adapt to the fuselage structure 10.

Although the present disclosure has hitherto been described entirely by way of preferred embodiments, it is not limited thereto, but can be modified in various ways.

For example, other, in particular eccentric, embodiments of the pressure bulkhead that are adapted to the fuselage structure are also conceivable. For example, in the case of an elliptical or pear-shaped fuselage structure, the pressure bulkhead and the reinforcing elements thereof may be provided so as to be correspondingly shaped.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A planar pressure bulkhead for an aircraft or spacecraft, the pressure bulkhead comprising:
   a first wall, which has a planar surface and is configured as a pressure seal for a fuselage structure;
   a second wall, which has a planar surface and is opposite the first wall; and
   a reinforcing structure between the first wall and the second wall and which comprises at least one circumferential monolithic reinforcing element, which has a plurality of oblique fins and one or more axial coupling elements;
   wherein the plurality of oblique fins extend from the first wall to the second wall and are inclined at a non-perpendicular angle relative to both the planar surface of the first wall and the planar surface of the second wall; and
   wherein each of the axial coupling elements is connected between adjacent oblique fins of the plurality of oblique fins.

2. The pressure bulkhead of claim 1, wherein the oblique fins extend circumferentially in a circular shape of a ring.

3. The pressure bulkhead of claim 2, wherein the oblique fins that extend circumferentially in the shape of a ring have different diameters and are arranged concentrically.

4. The pressure bulkhead of claim 1, wherein the oblique fins each comprise a radially outer flange on a first axial end and a radially inner flange on a second axial end for attachment to the first and second wall.

5. The pressure bulkhead of claim 4, wherein the first axial end is attached to the first wall by the radially outer flange and the second axial end is attached to the second wall by the radially inner flange.

6. The pressure bulkhead of claim 4, wherein the oblique fins and the radially inner and outer flanges are also circumferential.

7. The pressure bulkhead of claim 1, wherein the one or more axial coupling elements are supports that extend circumferentially in a shape of a ring and are arranged perpendicularly to the first and second walls, and wherein each of the one or more axial coupling elements is connected between a radially outer flange of a first fin of the adjacent oblique fins and a radially inner flange of a second fin of the adjacent oblique fins.

8. The pressure bulkhead of claim 1, wherein the circumferential monolithic reinforcing element has a three-dimensional structure, and wherein the plurality of oblique fins and the one or more axial coupling elements of the circumferential monolithic reinforcing elements are integrally formed with one another in the three-dimensional structure of the circumferential monolithic reinforcing element.

9. The pressure bulkhead of claim 1, wherein:
   the circumferential monolithic reinforcing element has a three-dimensional structure; and
   the plurality of oblique fins are integrally formed with one another in the three-dimensional structure of the circumferential monolithic reinforcing element.

10. The pressure bulkhead of claim 1, wherein the first and the second wall are interconnected on an outer peripheral edge and are configured for circumferential connection to a fuselage structure.

11. The pressure bulkhead of claim 10, wherein the first and the second wall are configured to form a join on the outer peripheral edge that is integrally formed with the peripheral edge for direct connection to the fuselage structure.

12. An aircraft or spacecraft comprising:
   a fuselage structure; and
   a planar pressure bulkhead, which is coupled in a circular manner to the fuselage structure and comprises:
      a first wall, which has a planar surface and is configured as a pressure seal for a fuselage structure;
      a second wall, which has a planar surface and is opposite the first wall; and
      a reinforcing structure between the first wall and the second wall and which comprises at least one circumferential monolithic reinforcing element, which has a plurality of oblique fins and one or more axial coupling elements;
      wherein the plurality of oblique fins which extend from the first wall to the second wall and are inclined at a non-perpendicular angle relative to both the planar surface of the first wall and the planar surface of the second wall; and
      wherein each of the axial coupling elements is connected between adjacent oblique fins of the plurality of oblique fins.

13. The aircraft or spacecraft of claim 12, wherein the first wall and the second wall are axially angled to form a join on a peripheral edge and are directly circumferentially coupled to the fuselage structure.

14. The aircraft or spacecraft of claim 12, wherein the first wall and the second wall comprise a common connection point for connecting a first limb of a circumferential folded sheet, the first limb extending radially from the circumferential folded sheet, the circumferential folded sheet being circumferentially attached by a second limb to a skin of the fuselage structure, the second limb extending axially from the circumferential folded sheet.

15. The aircraft or spacecraft of claim 12, wherein the oblique fins extend circumferentially in a shape of a ring and have different diameters and/or are arranged concentrically.

16. The aircraft or spacecraft of claim 12, wherein the oblique fins each comprise a radially outer flange on a first axial end and a radially inner flange on a second axial end for attachment to the first and second wall.

17. The aircraft or spacecraft of claim 16, wherein:
the first axial end is attached to the first wall by the radially outer flange and the second axial end is attached to the second wall by the radially inner flange; or
the oblique fins and the radially inner and outer flanges are also circumferential.

18. The aircraft or spacecraft of claim 12, wherein:
the one or more axial coupling elements are supports that extend circumferentially in a shape of a ring and are arranged perpendicularly to the first and second walls, and wherein each of the one or more axial coupling elements is connected between a radially outer flange of a first fin of the adjacent oblique fins and a radially inner flange of a second fin of the adjacent oblique fins; or
the circumferential monolithic reinforcing element has a three-dimensional structure, and wherein the plurality of oblique fins and the one or more axial coupling elements of the circumferential monolithic reinforcing elements are integrally formed with one another in the three-dimensional structure of the circumferential monolithic reinforcing element.

19. The aircraft or spacecraft of claim 12, wherein:
the circumferential monolithic reinforcing element has a three-dimensional structure; and
the plurality of oblique fins are integrally formed with one another in the three-dimensional structure of the circumferential monolithic reinforcing element.

20. The aircraft or spacecraft of claim 12, wherein:
the first and the second wall are interconnected on an outer peripheral edge and are configured for circumferential connection to a fuselage structure; and
the first and the second wall are configured to form a join on the outer peripheral edge that is integrally formed with the peripheral edge for direct connection to the fuselage structure.

* * * * *